United States Patent [19]
Chang

[11] Patent Number: 5,477,028
[45] Date of Patent: Dec. 19, 1995

[54] ELECTRIC BARBECUE GRILL

[76] Inventor: Kwei T. Chang, No.14, Lane 54, Luong Chuan St., Panchiao City, Taipei Hsien, Taiwan

[21] Appl. No.: 260,268

[22] Filed: Jun. 14, 1994

[51] Int. Cl.[6] .................................................. F27D 11/00
[52] U.S. Cl. ...................... 219/386; 392/418; 99/421 H; 99/443 R; 219/403
[58] Field of Search .................................. 392/407, 416, 392/418; 219/385, 386, 391, 392, 402–407, 418, 458; 99/443 R, 421 H

[56] References Cited

U.S. PATENT DOCUMENTS

| | | | |
|---|---|---|---|
| 2,631,216 | 3/1953 | Ames | 219/386 |
| 3,657,996 | 4/1972 | Thompson | 99/443 R |
| 3,848,523 | 11/1974 | Galisz et al. | 99/421 H |
| 4,641,015 | 2/1987 | Mayeur | 219/386 |

*Primary Examiner*—Tu Hoang
*Attorney, Agent, or Firm*—Browdy and Neimark

[57] ABSTRACT

An electric barbecue grill including a grill body having a half-round cooking chamber at the top and an electric heating coil horizontally disposed within the cooking chamber at the bottom, a motor mounted outside the cooking chamber and having a sprocket gear on the motor shaft thereof, a rotary cooking grid supported on pulleys within the cooking chamber at the set elevation and rotated horizontally by the sprocket gear along a track on the set elevation.

2 Claims, 9 Drawing Sheets

ELECTRIC BARBECUE GRILL

BACKGROUND OF THE INVENTION

The present invention relates to barbecue grills, and more particularly to an electric barbecue grill having a rotary cooking grid disposed between two electric heating coils and rotated horizontally by a motor through a sprocket gear.

Various barbecue grills have been disclosed using electric heating coils for roasting foods, and have appeared on the market. These electric barbecue grills commonly have a cooking grid fixed in position for carrying the foods above the electric heating coil for roasting. Because the electric heating coil is disposed below the cooking grid and the cooking grid is fixed in position, the foods cannot be evenly thoroughly roasted.

SUMMARY OF THE INVENTION

The present invention has been accomplished to provide an electric barbecue grill which eliminates the aforesaid problem. It is one object of the present invention to provide an electric barbecue grill which produces heat from different elevations to roast the foods from the top as well as the bottom. It is another object of the present invention to provide an electric barbecue grill which automatically turns the foods horizontally when roasting. It is still another object of the present invention to provide an electric barbecue grill which is suitable for use indoors as well as outdoors.

According to one aspect of the present invention, the electric barbecue grill comprises a grill body having a half-round cooking chamber at the top and an electric heating coil horizontally disposed within the cooking chamber at the bottom, a motor mounted outside the cooking chamber and having a sprocket gear on the motor shaft thereof, a rotary cooking grid supported on pulleys within the cooking chamber at the set elevation and rotated horizontally by the sprocket gear along a track on the set elevation. According to another aspect of the present invention, a plurality of supporting frames are provided for alternatively fastened to the grill body to support the rotary cooking grid at the desired elevation. According to still another aspect of the present invention, a plurality of guide frames are made on the cooking chamber at different elevations for guiding the rotary motion of the rotary cooking grid.

DETAILED DESCRIPTION OF THE PREFERRED EMBODIMENT

Figure 1:
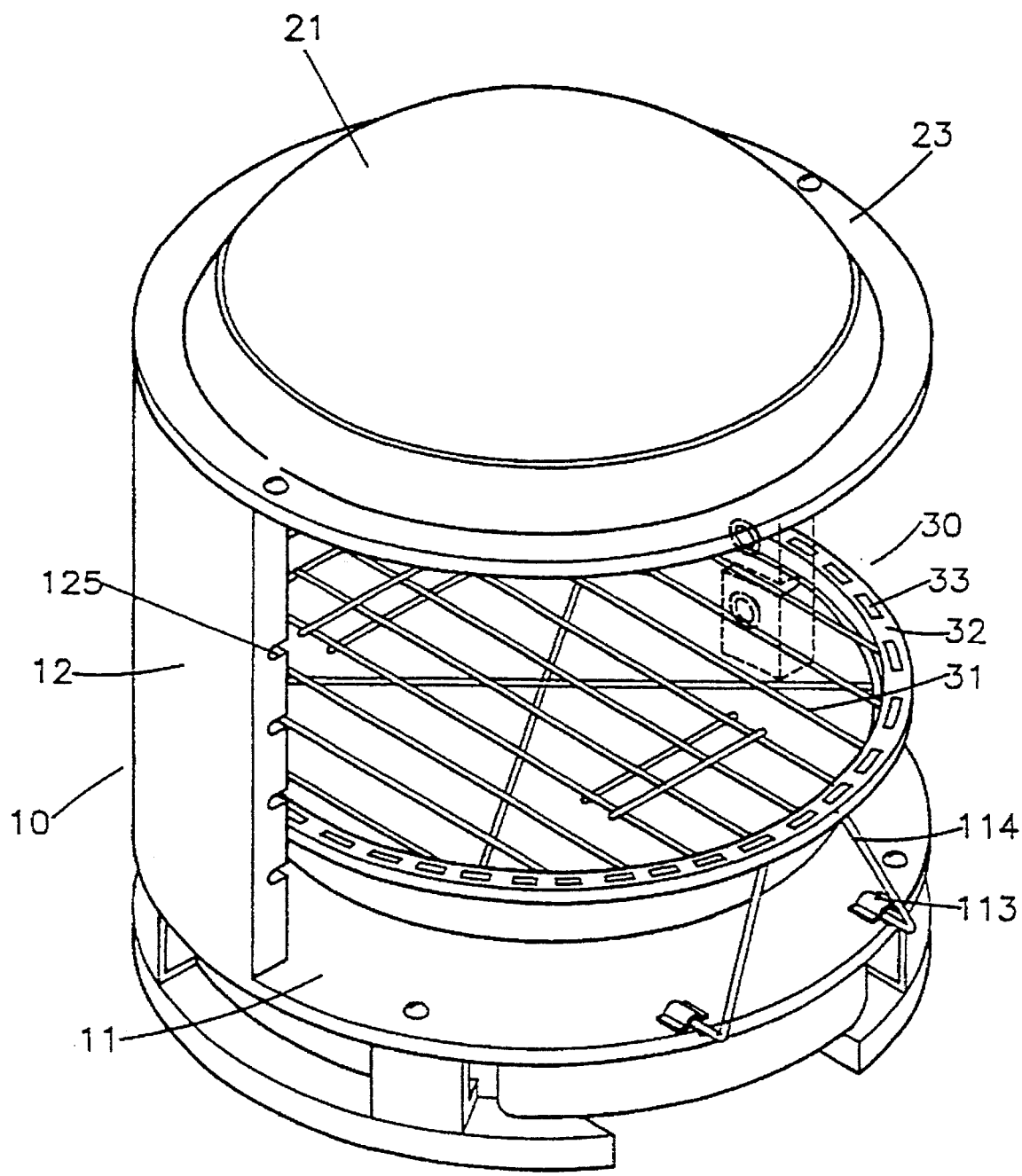
FIG. 1 is an elevational view of an electric barbecue grill according to the present invention.
Figure 2:
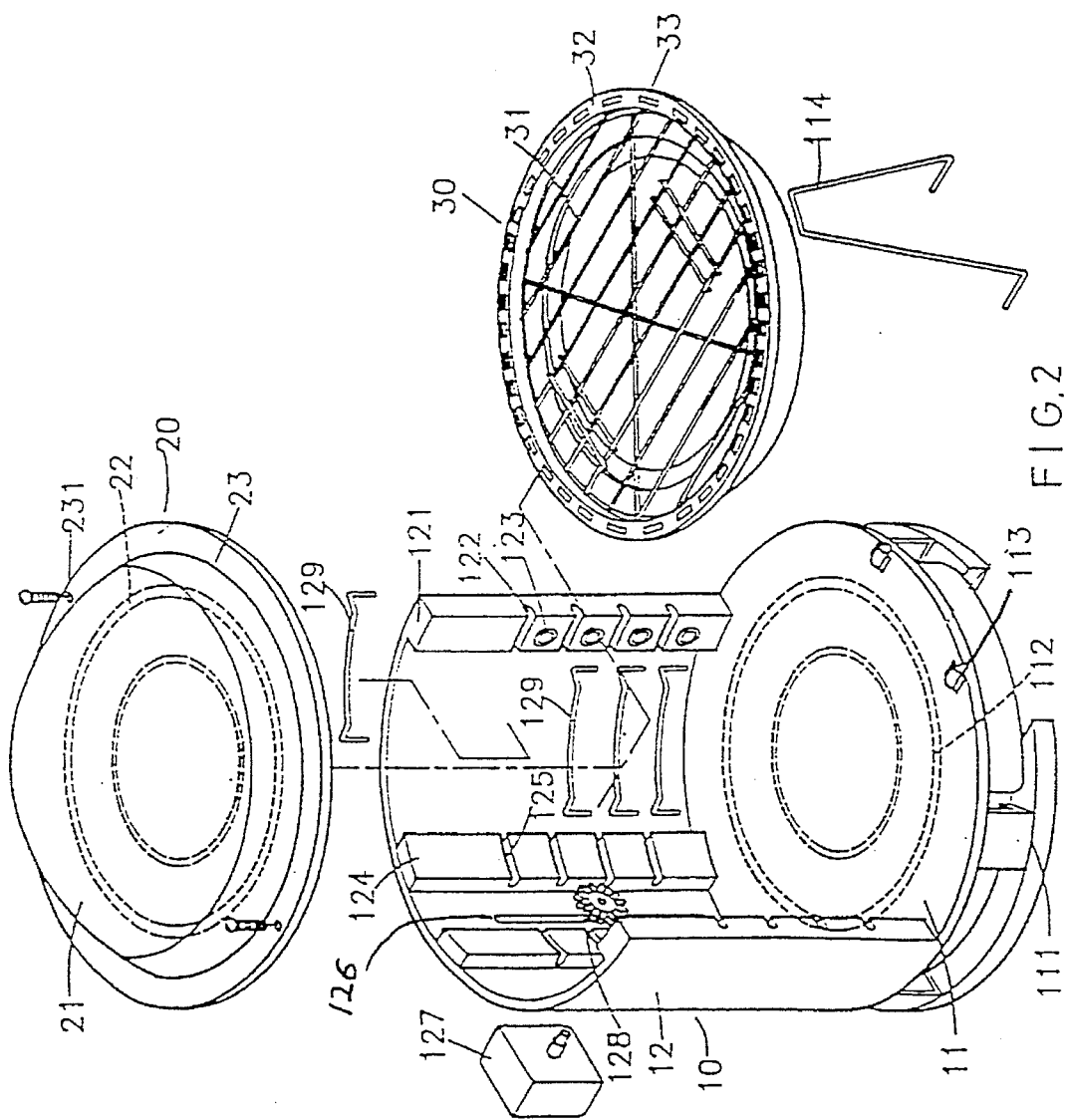
FIG. 2 is an exploded view of the electric barbecue grill shown in FIG. 1.
Figure 3:
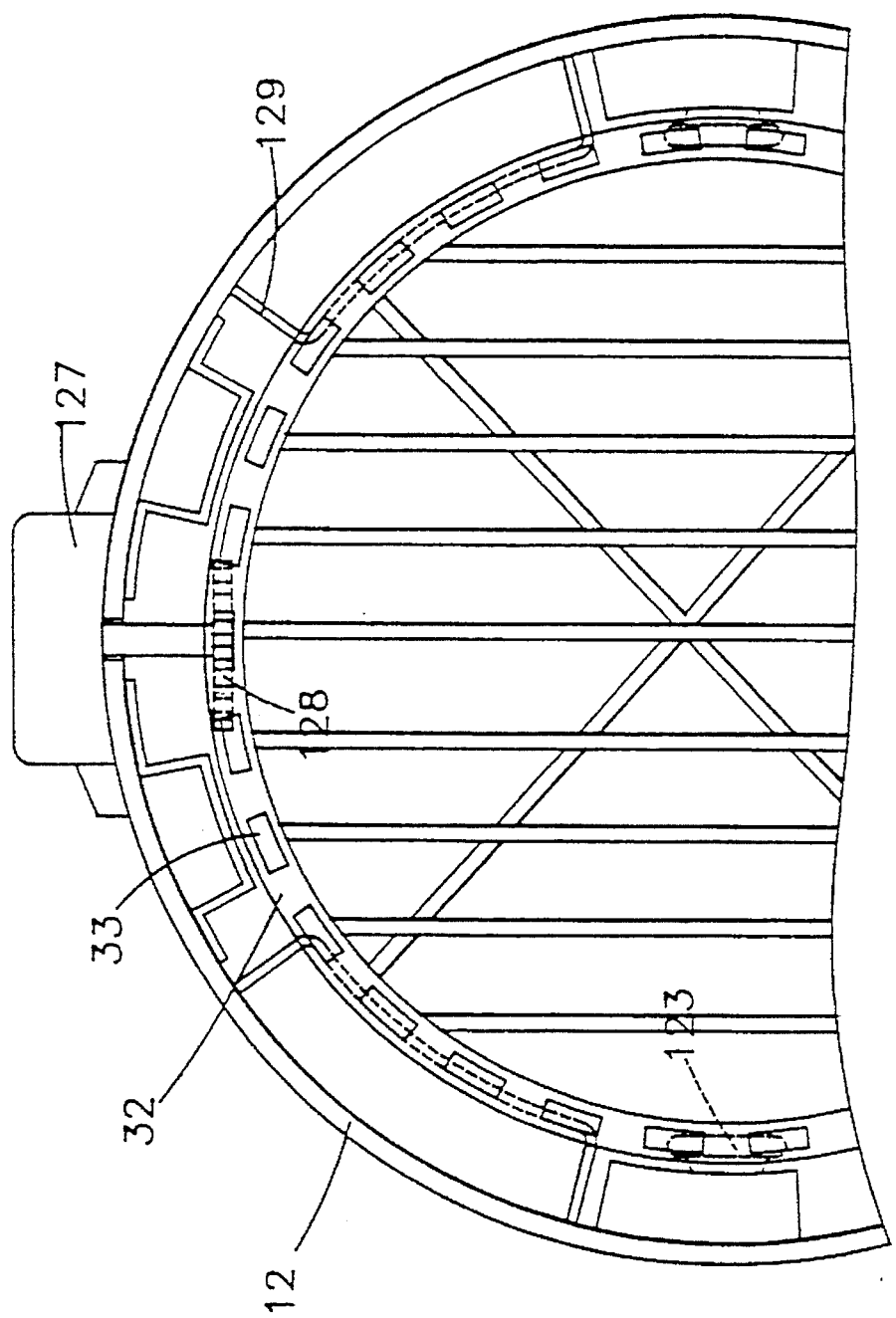
FIG. 3 is a top view of the electric barbecue grill shown in FIG. 2.
Figure 4:
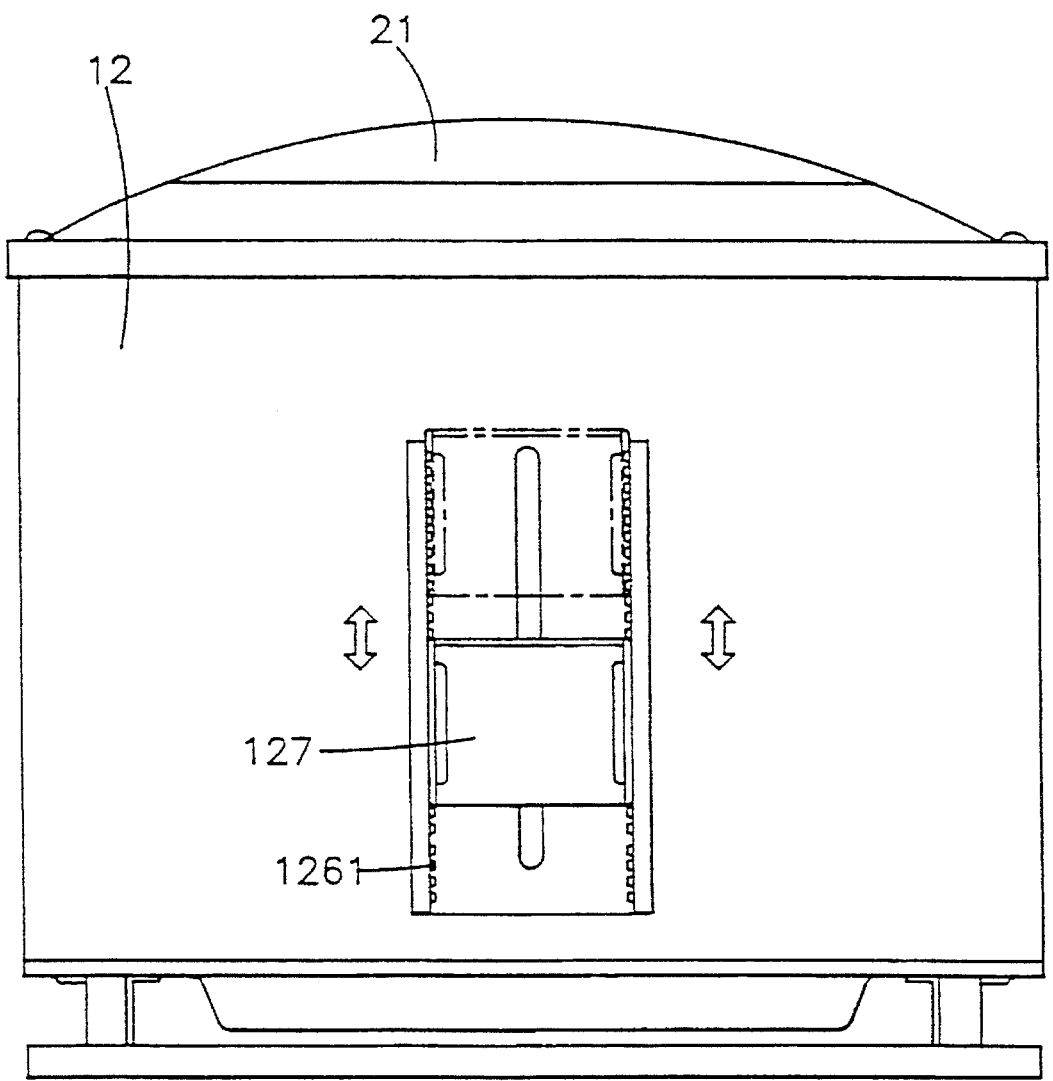
FIG. 4 is a back view of the electric barbecue grill shown in FIG. 2.
Figure 5:
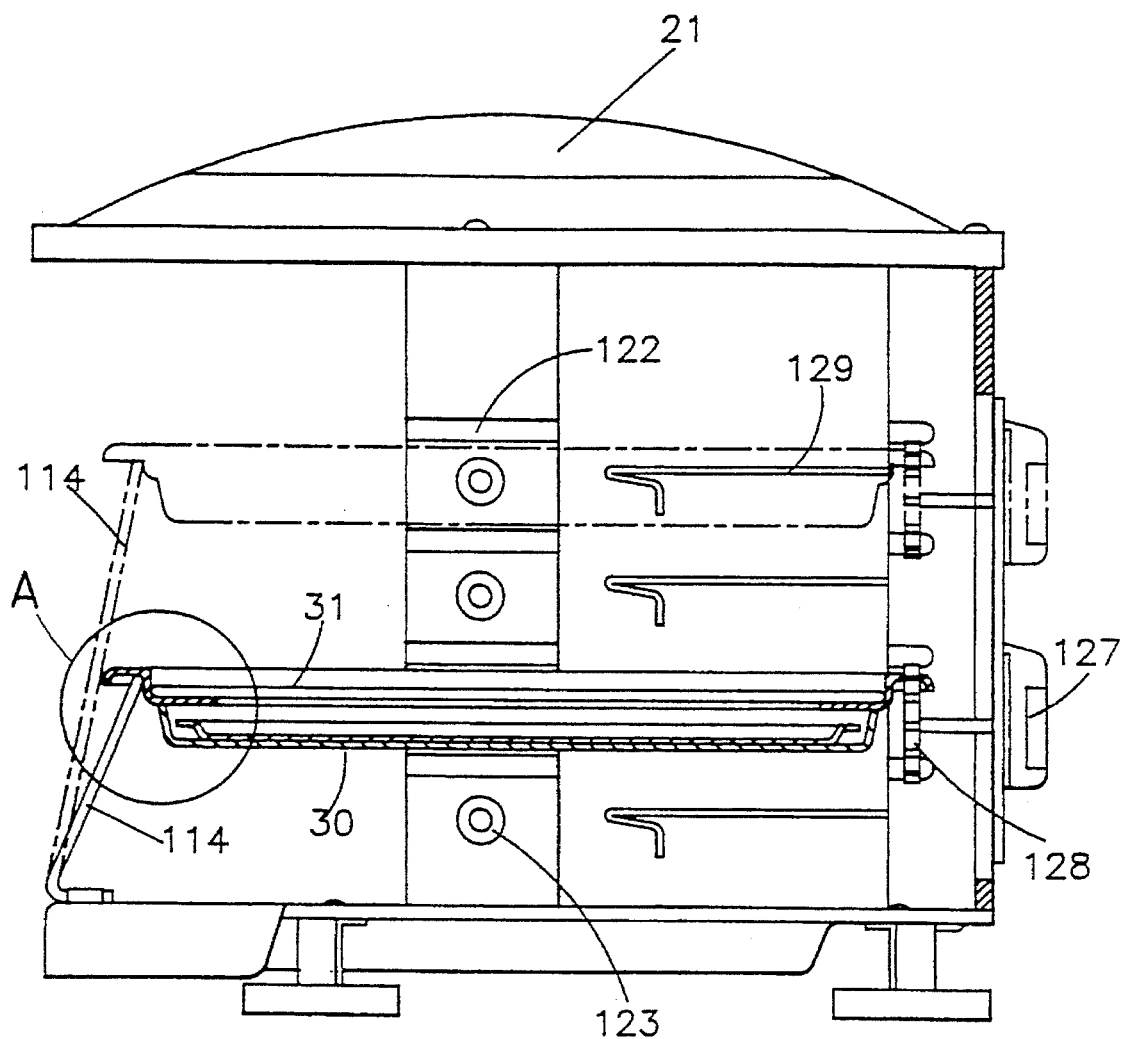
FIG. 5 is a side view in section of the electric barbecue grill shown in FIG. 2.
Figure 5A:
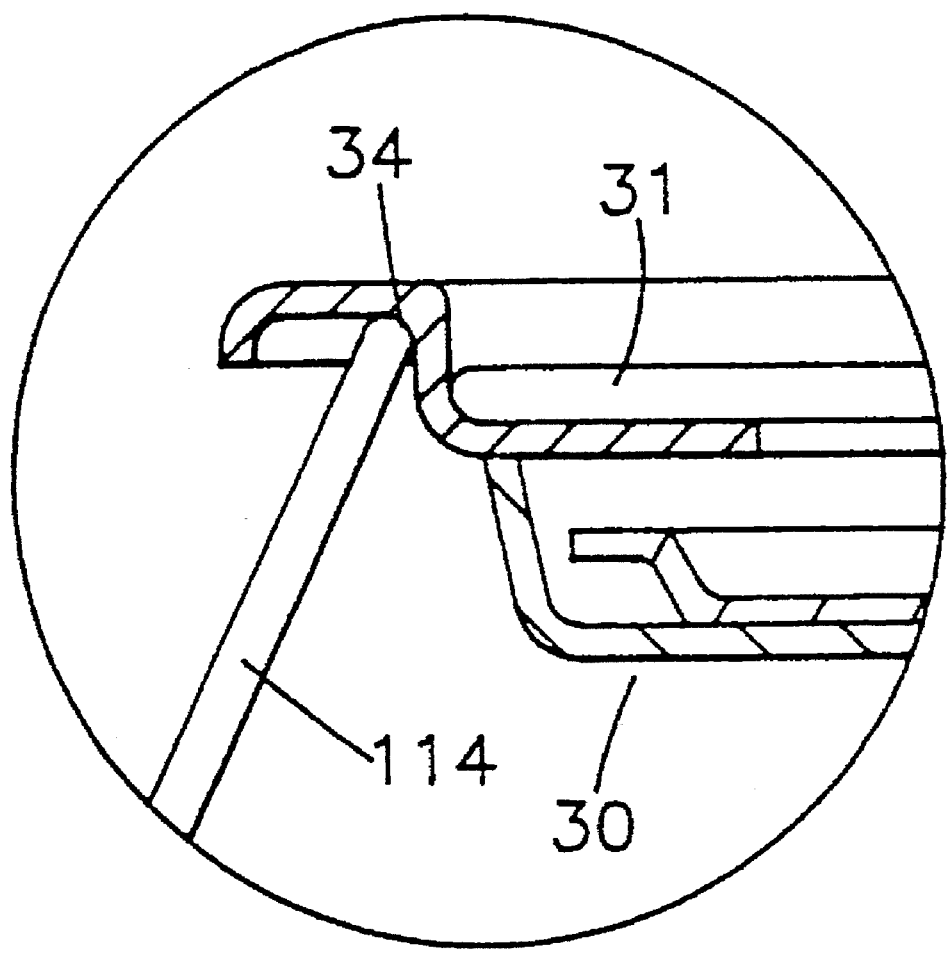
Figure 6:
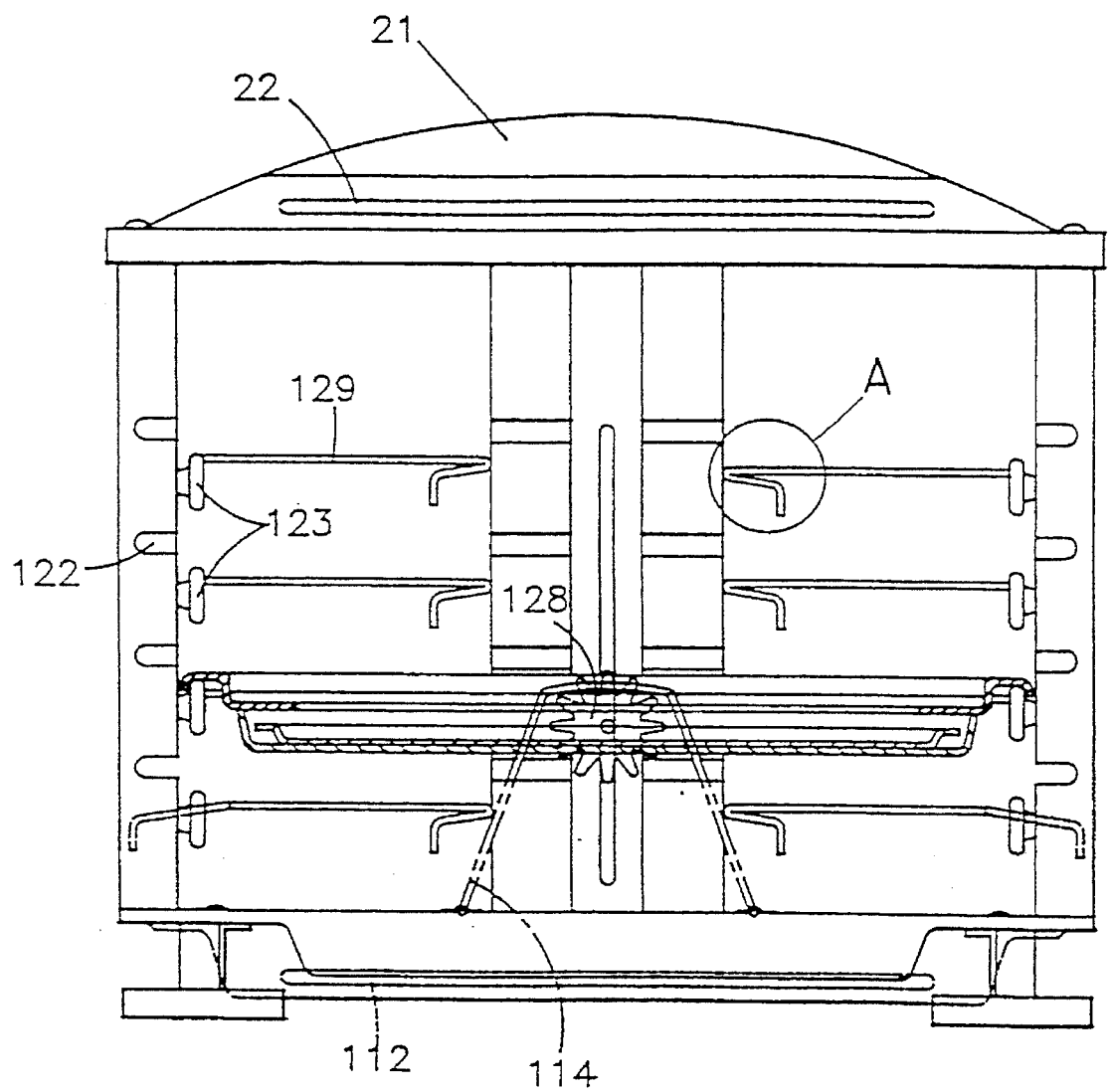
FIG. 6 is a front view of the electric barbecue grill shown in FIG. 2.
Figure 6A:
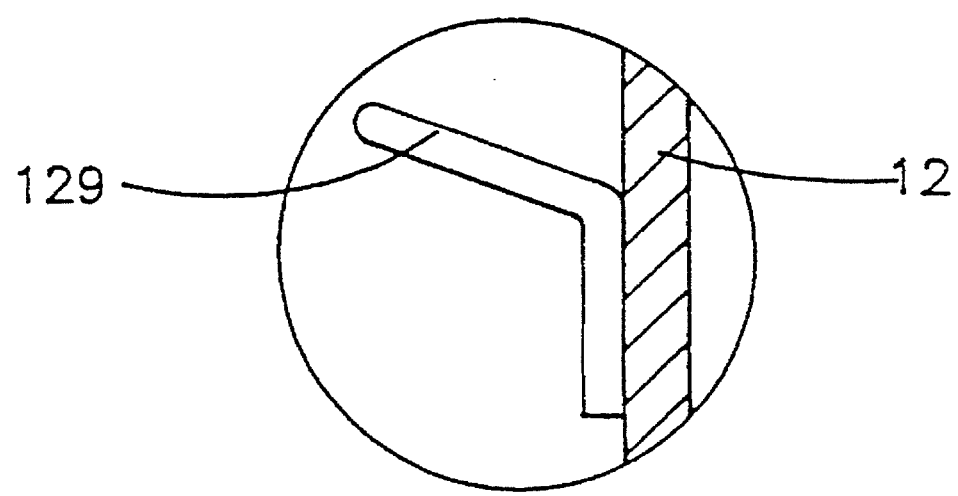

Referring to FIGS. 1 and 2, an electric barbecue grill according to the present invention is generally comprised of a grill body 10, a top cover 20, and a rotary cooking grid 30. The grill body 10 comprises a base 11 and a cooking chamber 12. The base 11 of the grill body 10 is equipped with stands 111 at the bottom, having an electric heating coil 112 mounted on the top wall thereof and a pair of axle housings 113 spaced at the top near the border for mounting any of a series of supporting frames 114 of different sizes. The supporting frames 114 are respectively made from an iron wire for alternatively fastening to the axle housings 113 to support the rotary cooking grid 30 at any of a variety of elevations. The cooking chamber 12 is made from a half-round frame upstanding from the base 11 of the grill body 10 at one side opposite to the axle housings 113, having two first upright bars 121 symmetrically disposed at two opposite ends thereof, two second upright bars 124 spaced between the first upright bars 121, a vertical slot 126 disposed between the second upright bars 124, and a plurality of guide frames 129 horizontally disposed at different elevations between the first upright bars 121 and the second upright bars 124 for guiding the rotary motion of the rotary cooking grid 30, wherein each first upright bar 121 has a plurality of transverse grooves 122 and a plurality of pulleys 123 alternatively disposed at different elevations; the each second upright bar 124 has a plurality of transverse grooves 125 disposed at different elevations corresponding to the transverse grooves 122 on the first upright bars 121. There is a motor 127 mounted outside the cooking chamber 12 and having its motor shaft inserted through the vertical slot 126, and a sprocket gear 128 coupled to motor shaft of the motor 127 and disposed inside the cooking chamber 10. The top cover 20 comprises a dome head 21 having an electric heating coil 22 on the inside and a mounting flange 23 around the dome head 21. The mounting flange 23 has a plurality of screw holes 231 for fastening to the cooking chamber 12 at the top by screws. The rotary cooking grid 30 comprises a circular grid body 31 having a circular rim 32. The rim 32 has a series of holes 33 spaced around the border for matching with the sprocket gear 128, and a track 34 at the bottom for matching with the pulleys 123 and the supporting frames 114.

Referring to FIGS. 3, 4, 5, and 6, the rim 32 of the rotary cooking grid 30 is inserted into the transverse grooves 122 and 125 on the first and second upright bars 121 and 124 at the selected elevation permitting the holes 33 to mesh with the sprocket gear 128 and the track 34 to match with the corresponding pulleys 123, then the corresponding supporting frame 114 is fastened to the axle housings 113 to support the rotary cooking grid 30 at the selected elevation. The vertical slot 126 has two vertical rows of teeth 1261 bilaterally disposed along the length. The motor 127 is adjustably fastened between the two vertical rows of teeth 1261 on the outside wall of the cooking chamber 12. Therefore, the motor 127 can be moved vertically to the desired elevation. When the motor 127 is started, the sprocket gear 126 is driven to turn the rotary cooking grid 30 as the electric heating coils 112 and 22 are turned on to produce heat in roasting foods. Because the rotary cooking grid 30 is peripherally supported on the guide frames 129 at the selected elevation, the rotary motion of the rotary cooking grid 30 is smoothened.

Figure 7:
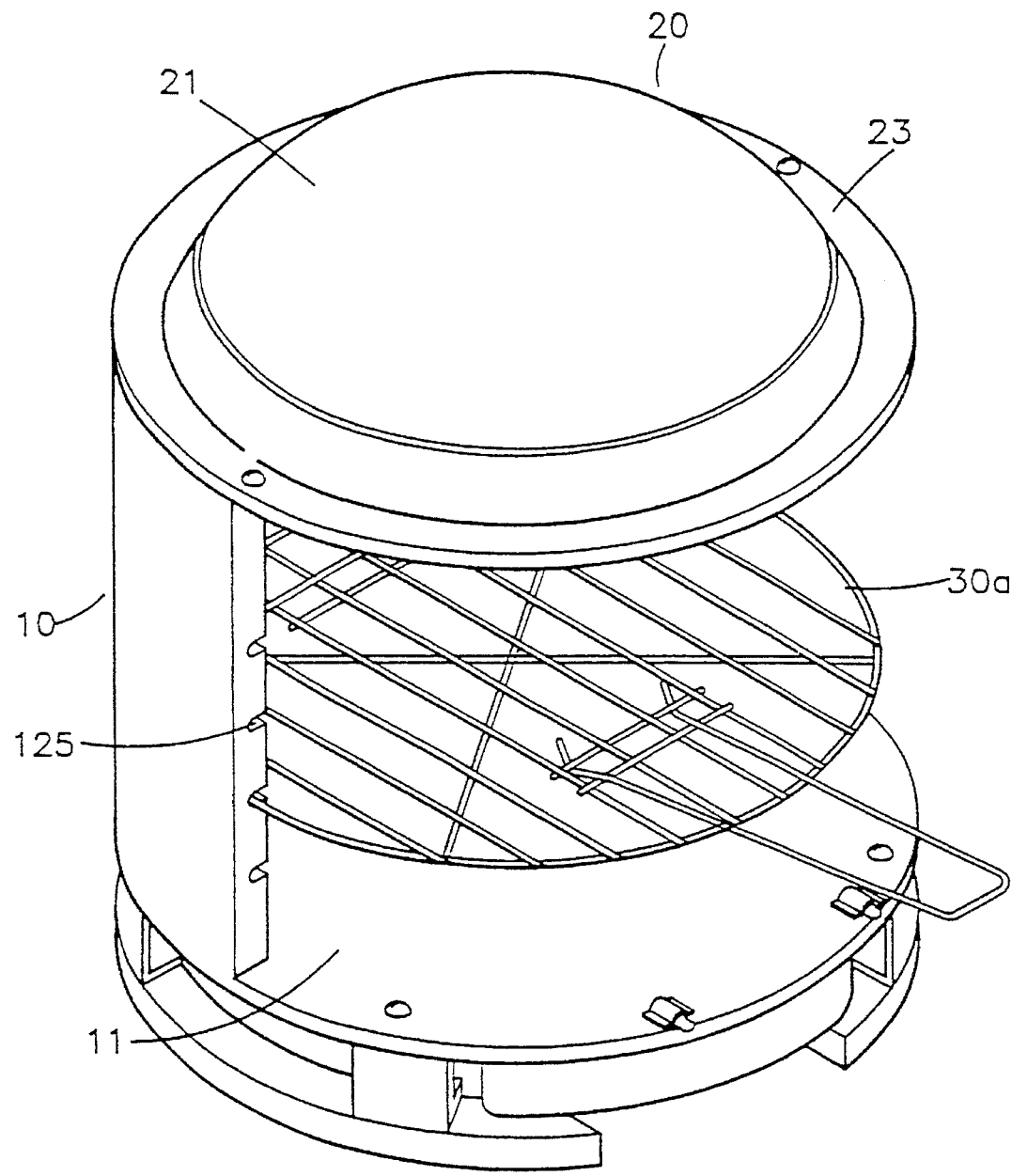
FIG. 7 shows a standing cooking grid used instead of the rotary cooking grid according to the present invention.

Referring to FIG. 7, a standing cooking grid 30a may be used instead of the rotary cooking grid 30.

While only one embodiment of the present invention has been shown and described, it will be understood that various modifications and changes could be made without departing from the spirit and scope of the invention.

What is claimed is:

1. An electric barbecue grill comprising:

a grill body having a base and a cooking chamber upstanding from said base, said base being supported on stands, having an electric heating coil mounted within a top wall of said base and electrically connected to produce heat for cooking foods disposed above and a pair of axle housings disposed on the top wall of said base opposite to said cooking chamber, said cooking chamber comprising a plurality of tracks and a plurality of pulleys spaced at different elevations and a vertical slot;

a rotary cooking grid having a circular rim inserted into one of said tracks on said cooking chamber and disposed above the electric heating coil, said rim of said rotary cooking grid having a series of holes spaced around the border and a track at the bottom along the border for matching with the pulleys on said cooking chamber;

a top cover fastened on a top of said cooking chamber, said top cover having an electric heating coil on the inside electrically connected to produce heat for cooking foods being placed on said rotary cooking grid;

a motor drive mounted outside said cooking chamber, said motor drive comprising a motor having an output shaft inserted through said vertical slot, and a sprocket gear coupled to said output shaft of said motor and meshed with the holes on the rim of said rotary cooking grid and driven by said motor to turn said rotary cooking grid along the one of said tracks on said cooking chamber; and a plurality of supporting frames of different heights selectively fastened to said axle housings to support said rotary cooking grid at an elevation corresponding to the one of said tracks on said cooking chamber.

2. The electric barbecue grill of claim 1 further comprising a plurality of guide frames fastened to said cooking chamber at different elevations corresponding to the tracks on said cooking chamber for guiding the rotary motion of said rotary cooking grid.

\* \* \* \* \*